US008443546B1

(12) United States Patent
Darin (10) Patent No.: US 8,443,546 B1
(45) Date of Patent: May 21, 2013

(54) HYDROPONIC PLANT GROWING SYSTEM

(76) Inventor: Raymond J. Darin, Anna Maria, FL (US)

( * ) Notice: Subject to any disclaimer, the term of this patent is extended or adjusted under 35 U.S.C. 154(b) by 356 days.

(21) Appl. No.: 12/965,343

(22) Filed: Dec. 10, 2010

(51) Int. Cl.
*A01G 31/00* (2006.01)

(52) U.S. Cl.
USPC .............................. 47/60; 47/59 R; 47/62 R (58) Field of Classification Search
USPC ................... 47/17, 59 R, 60, 61, 62 N, 62 R, 47/63, 79
See application file for complete search history.

(56) References Cited

U.S. PATENT DOCUMENTS

| | | | | |
|---|---|---|---|---|
| 3,943,658 | A * | 3/1976 | Hai | 47/60 |
| 4,198,783 | A * | 4/1980 | Leroux | 47/60 |
| 4,543,744 | A * | 10/1985 | Royster | 47/17 |
| 5,111,612 | A * | 5/1992 | Takishima et al. | 47/60 |
| 5,315,834 | A * | 5/1994 | Garunts et al. | 62/78 |
| 5,433,923 | A * | 7/1995 | Wolverton et al. | 422/121 |
| 5,509,946 | A * | 4/1996 | Chu | 96/140 |
| 5,946,853 | A * | 9/1999 | Jacobs et al. | 47/60 |
| 6,006,471 | A * | 12/1999 | Sun | 47/69 |
| 6,197,094 | B1 * | 3/2001 | Thofelt | 95/211 |
| 6,536,157 | B2 * | 3/2003 | Wijbenga | 47/17 |
| 6,725,598 | B2 * | 4/2004 | Yoneda et al. | 47/60 |
| 7,069,691 | B2 * | 7/2006 | Brooke et al. | 47/59 R |
| 7,426,802 | B2 * | 9/2008 | Umbaugh, Jr. | 47/62 R |
| 7,565,765 | B2 * | 7/2009 | Brooke et al. | 47/62 R |
| 7,617,057 | B2 * | 11/2009 | May et al. | 702/62 |
| 7,987,632 | B2 * | 8/2011 | May et al. | 47/17 |
| 8,291,639 | B2 * | 10/2012 | Gardner et al. | 47/60 |
| 2002/0136669 | A1 * | 9/2002 | Marques | 422/106 |
| 2005/0039397 | A1 * | 2/2005 | Roy | 47/62 R |
| 2005/0178058 | A1 * | 8/2005 | Rudolph | 47/60 |
| 2007/0144067 | A1 * | 6/2007 | Farhadi | 47/39 |
| 2010/0115834 | A1 * | 5/2010 | Miyahara | 47/65.5 |

FOREIGN PATENT DOCUMENTS

CN 201783266 U * 4/2011

* cited by examiner

*Primary Examiner* — Frank T Palo
(74) *Attorney, Agent, or Firm* — Charles J. Prescott P.A.

(57) ABSTRACT

A hydroponic plant growing system including a housing divided into a growing chamber and a fragrance masking manifold by an electrical control panel having spaced holes formed therethrough which permits air flow between the growing chamber and the fragrance masking manifold. A water reservoir is defined between a reservoir top panel and a bottom panel of the housing, the top panel having spaced plant basket collars adapted to support a plant cup to position plant roots in reservoir and to position plant vegetation within the growing chamber. Air discharge tubes in the growing chamber discharge ambient air into the growing chamber by a fan to circulate air through the growing chamber into the fragrance masking manifold where a fragrance source masks odors before the air is discharged back to ambient. An irrigation pump dispenses water into each plant cup, excess water drained back into the reservoir.

10 Claims, 13 Drawing Sheets

FIG. 13 though the top cover. The dipstick tube also provides
venting for the water reservoir.

HYDROPONIC PLANT GROWING SYSTEM

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to plant growing systems, and more particular to a hydroponic plant growing system designed for optimal plant growth in an economy sized virtually self-contained growing structure.

2. Description of Related Art

Home gardening is exhibiting a resurgence in popularity for homeowners in the United States. As food prices rise at the marketplace, more and more homeowners are turning to cultivating small gardens and raising farm animals for producing food and dairy products. However, the apartment and condo owner without access to cultivated ground has been restricted or prohibited from such individual gardening and growing activities. With the advent of hydroponic and aeroponic vegetable and plant growth techniques, smaller systems are becoming more popular for producing relatively smaller quantities of edible foods, herbs and the like. These growing systems depend upon the utilization of nutrient rich water and moisture to nourish the roots of small plants and the germination of seeds within a growing medium to support plant growth. No dirt or potting soil is required, but rather the roots of a plant are consistently and routinely exposed to the water or water vapor nutrient rich environment to support such growth.

The present invention teaches the incorporation of hydroponic growth into a compact apartment or condo-size system which is self-contained and may be easily maintained in a closed environment to cultivate and grow small plants from seeds or seedlings to full maturity in a relatively short period of time as opposed to the normal growth cycle in conventional gardening techniques in the outdoors.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a hydroponic plant growing system including a housing divided into a growing chamber and a fragrance masking manifold by an electrical control panel having spaced holes formed therethrough which permits air flow between the growing chamber and the fragrance masking manifold. A water reservoir is defined between a reservoir top panel and a bottom panel of the housing, the top panel having spaced plant basket collars adapted to support a plant cup to position plant roots in reservoir and to position plant vegetation within the growing chamber. Air discharge tubes in the growing chamber discharge ambient air into the growing chamber by a fan to circulate air through the growing chamber into the fragrance masking manifold where a fragrance source masks odors before the air is discharged back to ambient. An irrigation pump dispenses water into each plant cup, excess water drained back into the reservoir.

The PERSONAL INDOOR GARDEN (PIG) is an enclosed, self-contained and fully automated plant cultivation module that provides the novice gardener a complete mini-indoor greenhouse environment to grow plants at an accelerated rate.

The PIG combines state-of-the art materials; growing medium, irrigation/nutrient solution system, ventilation system, lighting and electrical automation system, aeration and reservoir discharge systems that provide the home gardener with a small eco-environment unit for plants similar to what a salt water aquarium provides to fish. All PIG components are high quality, standard sizes for replacement, availability and savings.

The Shell

The PIG shell and plastic components are fabricated using high tech computerized cutting (CNC) machines. This method of production combines maximum efficiency (time savings) with minimal waste. Shell construction allows for simple access for maintenance and repairs. Highlights are:

Shell is made from marine grade polymer sheeting ("STARBOARD").
  The exterior color of the PIG is black.
  Light weight and durable.
  Access to growing chamber from hinged top panel.
  The Light Viewing Filter is located under the hinged top panel. The filter allows viewing without opening the housing during critical light cycles.
  All hardware (screws, bolts, nuts & hinges) are made from marine-grade 316 stainless steel.
  Access door to various components is on back of unit.

Growing Medium

In the bottom of the growing chamber, the seeds are placed into the plastic netted plant baskets. The plant baskets are filled with growing media of approximately forty (40) ½" "GORDON" rockwool cubes. The plant baskets allow direct drainage to the reservoir. Each plant basket (total of 4) is placed within a basket collar. Each collar has a single tuned water nozzle for irrigation. Basket collars allow for easy removal of individual plant root balls without impacting the others.

Irrigation System

The reservoir is constructed of hand-laid reinforced fiberglass for durability and watertight integrity. The ten (10) gallon capacity reservoir is divided into six (6) separate compartments. Two (2) compartments are for pump isolation and four (4) compartments are for root ball separation.

Water (nutrient solution) maintains constant temperature by the "radiator style" tube heat exchanger ventilation system molded within the reservoir.
  The 160 gph irrigation pump is mounted in the reservoir and provides constant supply of nutrient solution directly to the plant through the calibrated water nozzles located on each of the four (4) basket collars.
  The Irrigation pump is protected by baffles that prevent clogging by the plant root balls.
  The irrigation pump is controlled by a 24 hour intermittent timer located on the Electrical Control Panel (ECP).
  Access to add water and nutrient solutions, testing and to monitor water levels is provided via a dipstick tube located at the top of the housing. A customized dipstick preferably with a small sample vile attached is located within the dipstick tube.

Lighting

The energy efficient lighting system consists of four (4)-125 watt Compact Fluorescent Replacement Bulbs (CFRB) powered by two (2) independent electronic ballasts. Lighting provides a total of 500 watts while using minimal power consumption of only 108 watt total.

- The height and angle of the CFRB's can be adjusted using vertical light slides to maximize exposure to the plant canopy as it grows.
- Lighting is controlled by a separate 24 hour intermittent timer located on the Electrical Control Panel (ECP).
- The growing chamber inside walls are lined with light reflective film to increase light intensity and even distribution.
- Located around each basket collar is a ring-shaped flat reflector which prevents mold from growing in the rockwool cubes.

Ventilation System

The PIG maintains a constant internal temperature by utilizing two 65 cfm inline fans. Fresh air is drawn into the housing through four (4) 1" diameter inlet ports located in the back panel of the housing. Air continues to flow horizontally through 1" air ducts located in and cooled by water via the reservoir. The air continues to enter the growing chamber vertically via four (4) 1" perforated tubes. Vertical or upright perforated tubes in the growing chamber distribute air evenly throughout the growing chamber to provide balanced air circulation.

The air passes through the growing chambers, cooling the plants and continues through the perforated Electrical Control Panel into the Fragrance Masking Manifold. The manifold has two (2) 1 lb "ONA" gel air fragrance masks or neutralizers that absorb odors as air is drawn by the fan and discharged from an outlet port in the back panel of the housing.

- The ventilation fan runs continuous while the PIG power switch is in the on position.
- Second fan comes on when lights are turned on.
- All 4" ductwork is wire reinforced.
- A small self-contained water chiller can be installed (optional) to reduce high reservoir water temperatures which will reduce intake air temperature.

Aeration System

The nutrient solution maintains a constant supply of oxygen by a 3.2 liter air pump. The pump distributes air through a ¼" clear tubing to a 6" air stone located in the reservoir. The air pump is mounted on the electrical control panel in the growing chamber and is controlled by its own On/Off volume switch.

Electrical System

The PIG is powered by a single 110 v grounded power cord. Power travels through the cord directly to a low profile On/Off switch located on the back of the housing. From the switch, power runs through a single 15 amp push button circuit breakers and then to the wiring harness.

- The inline circuit breaker eliminates the need for GFI compliance while providing maximum electrical safety.
- Power from the circuit breaker travels to the electrical control panel via a 14 gauge wiring harness along with two (2) duplex outlets, a single outlet and a single pole switch.
- The duplex outlets provide power for:
  - Two (2) 24 hour programmable timers for the lighting system and for the irrigation pump.
  - The air pump and one spare.
- The single outlet provides power for the reservoir discharge pump and is controlled by the single pole switch.
- The wire harness provides electricity to two (2) electronic ballasts which power the compact fluorescent replacement bulbs located in the growing chamber and the inline ventilation fan located behind the electrical control panel.
- All electrical components are UL approved and can be disconnected from the wiring harness by snap disconnects for ease in maintenance or replacement.

Reservoir Drainage System (RDS)

The RDS is used during periodic reservoir flushing and allows for complete reservoir drainage within 4 minutes. The RDS includes a single 160 gph water pump located in the reservoir. The water pump discharges via a ½" dia—6' hose located in the growing chamber for easy access and is controlled by a switch located on the control panel.

Shipping

The PIG's overall dimensions have been designed to minimize shipping cost to allow delivery using standard UPS ground shipping rates. The PIG is packaged and shipped fully assembled in a heavy-duty, double-walled, corrugated custom carton. Packaging provides maximum product protection while ease of un-packaging and set-up.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

Exemplary embodiments are illustrated in reference figures of the drawings. It is intended that the embodiments and figures disclosed herein are to be considered to be illustrative rather than limiting.

DETAILED DESCRIPTION OF THE INVENTION

Figure 1:
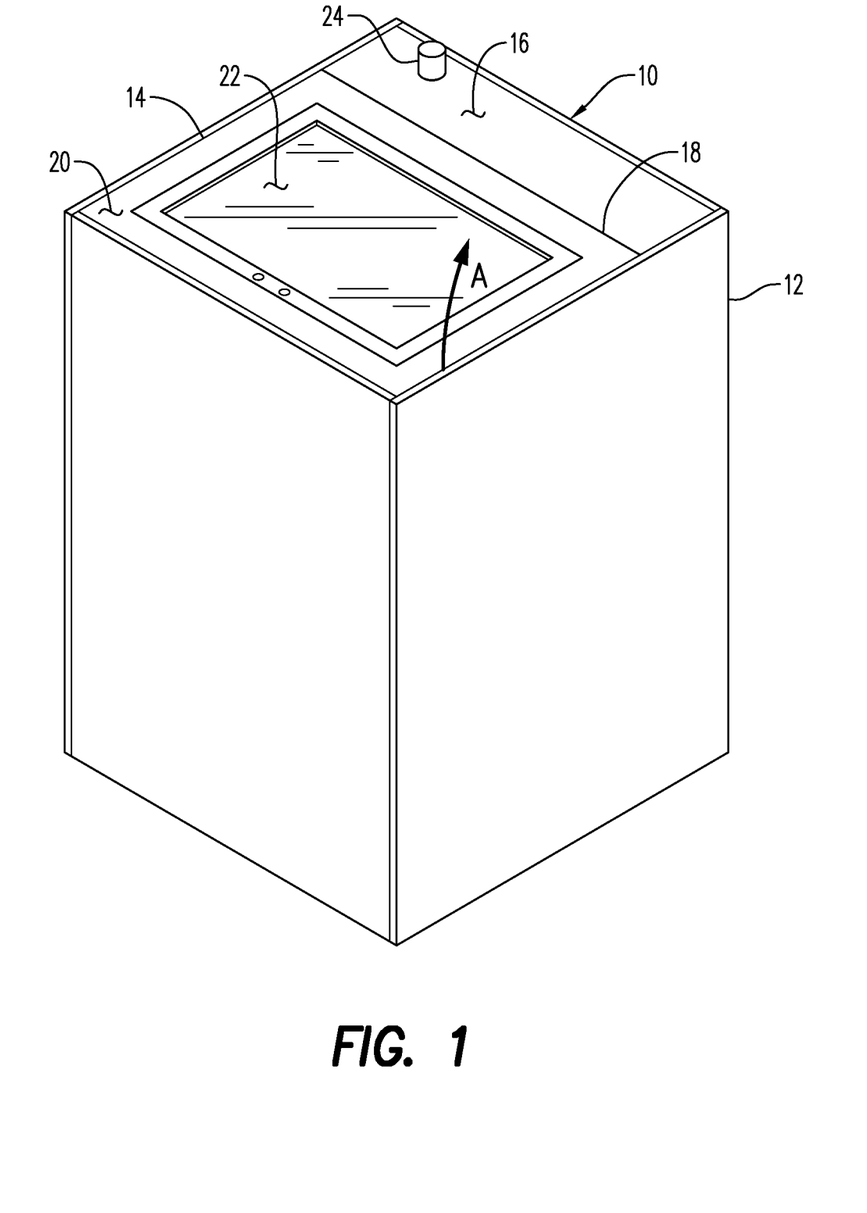
FIG. 1 is a perspective view of the invention.
Figure 2:
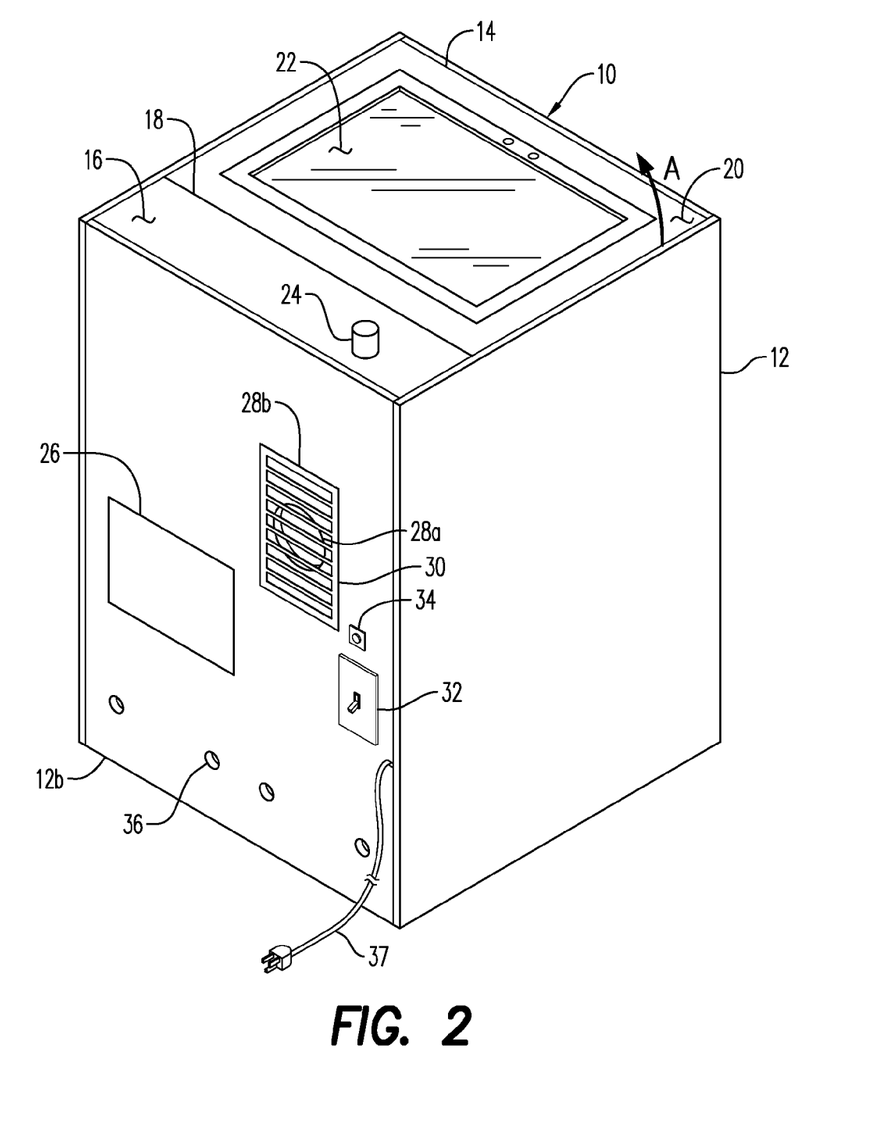
FIG. 2 is another perspective view of the invention.
Figure 3:
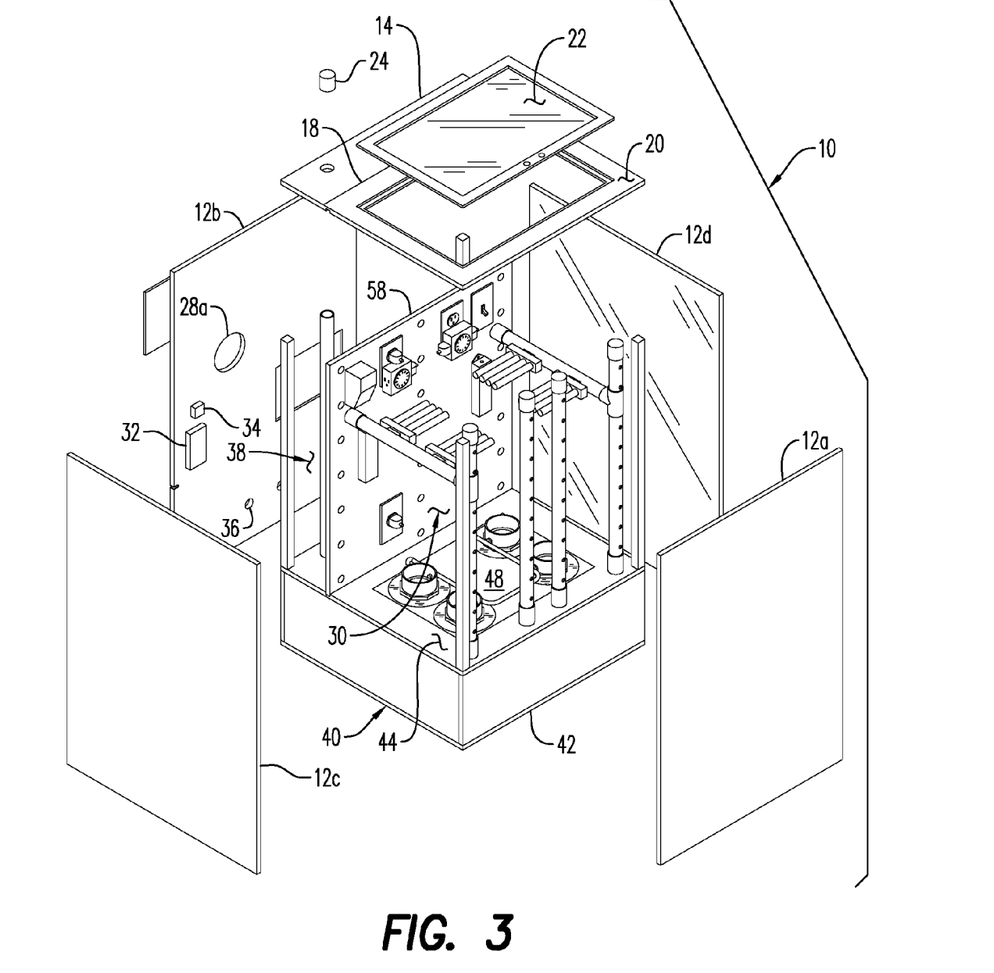
FIG. 3 is an exploded perspective view of the invention.
Figure 4:
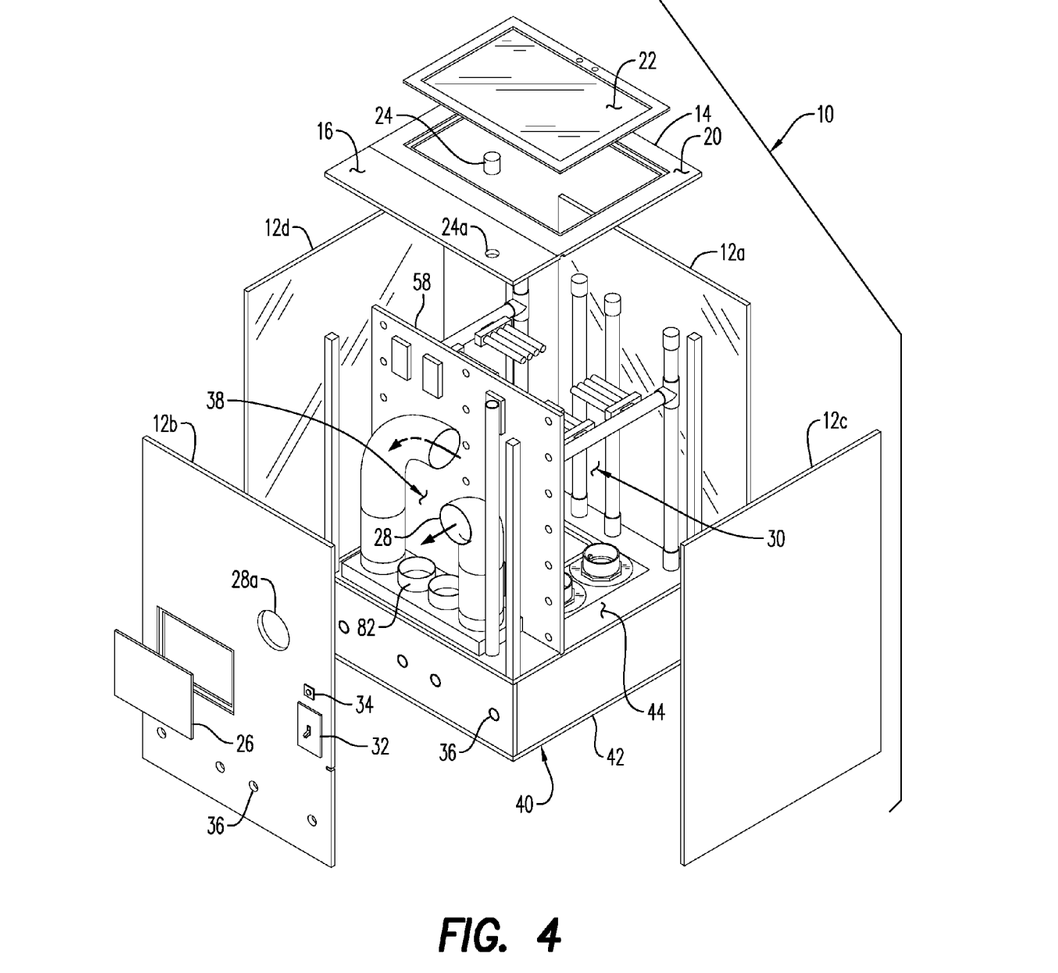
FIG. 4 is another exploded perspective view of the invention.

Nomenclature 10. plant growing system
12. housing
14. top panel
16. lid support panel
18. lid hinge
20. lid
22. transparent window
24. dipstick cover
26. access panel
28. air exhaust port
30. growing chamber
32. power switch
34. fuse
36. fresh air inlet port
38. fragrance masking manifold
39. power cord
40. reservoir
42. reservoir bottom
44. reservoir top panel
46. plant basket collar
48. reservoir access plate
50. perforated air discharge tube
52. air discharge port
54. light support arm
56. fluorescent growing light
58. electrical control panel
60. dipstick support tube
62. air transfer port
64. fan switch
66. light timer
68. irrigation pump timer
70. air stone
72. air pump
74. light ballast
76. reservoir discharge pump power cord
78. reflective disc
80. fragrance manifold
82. fragrance masking unit
84. dipstick
86. fragrance masking manifold exhaust tube
88. air transfer tube
90. water feed conduit
92. water nozzle
94. water return conduit
96. reservoir discharge pump
98. irrigation pump
100. water conduit
102. reservoir chamber
106. reservoir liner
108. air supply tube
110. electrical control diagram
112. inline fan
114. inline fan
116. reservoir drainage tube
P. plant basket
GM. growing medium Referring now to the drawings, the plant growing system or PERSONAL INDOOR GARDEN (PIG) is shown generally at numeral 10 in FIGS. 1 to 4. The system 10 includes a rectilinear housing 12 formed of plastic STARBOARD paneling material and, as best seen in FIGS. 3 and 4, includes a front panel 12a, side panels 12c and d, and a back panel 12b. The bottom of the housing 12 is formed by a molded fiberglass reservoir 40 having a reservoir bottom 42 which will be described more fully herebelow.

A top panel 14 of the housing 10 is formed having an openable lid 20 hingedly connected to a fixed lid support panel 16 whereby the lid 20 is openable about a lid hinge 18 in the direction of arrow A. A transparent window 22 fitted into the lid 20 is also provided for viewing the progress of growth within the system 10 without having to open the lid 20. As seen in FIGS. 2 and 4, the back panel 12b includes a removable access panel 26, an air exhaust aperture 28a protectively covered by an air grill 28b, a power switch 32, operably connected to a resettable fuse 34 and a power supply cord 37 connectable a conventional electric power outlet.

Figure 5:
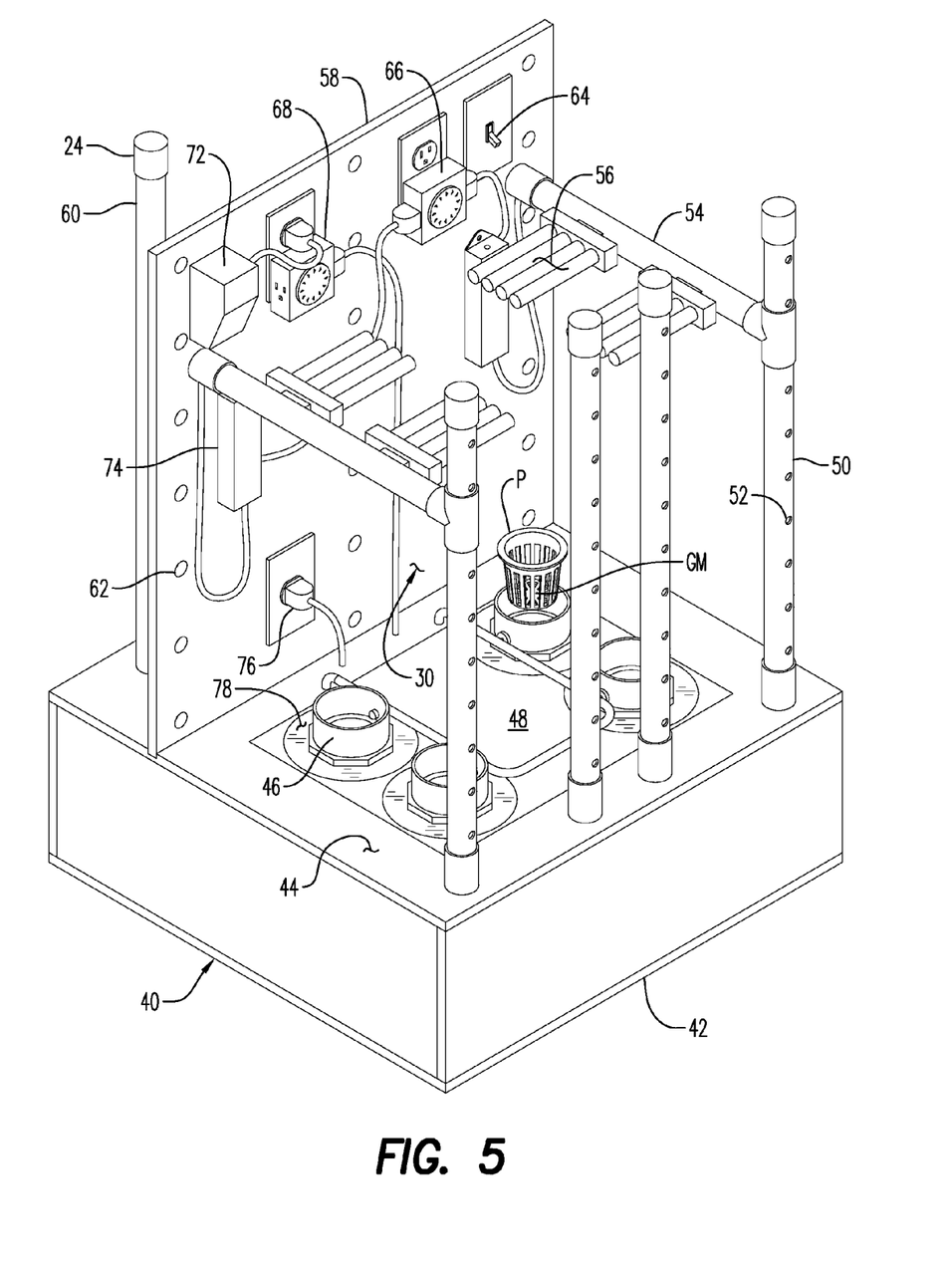
FIG. 5 is a perspective view of the invention absent the side, front, back and top panels of the housing for clarity.
Figure 11:
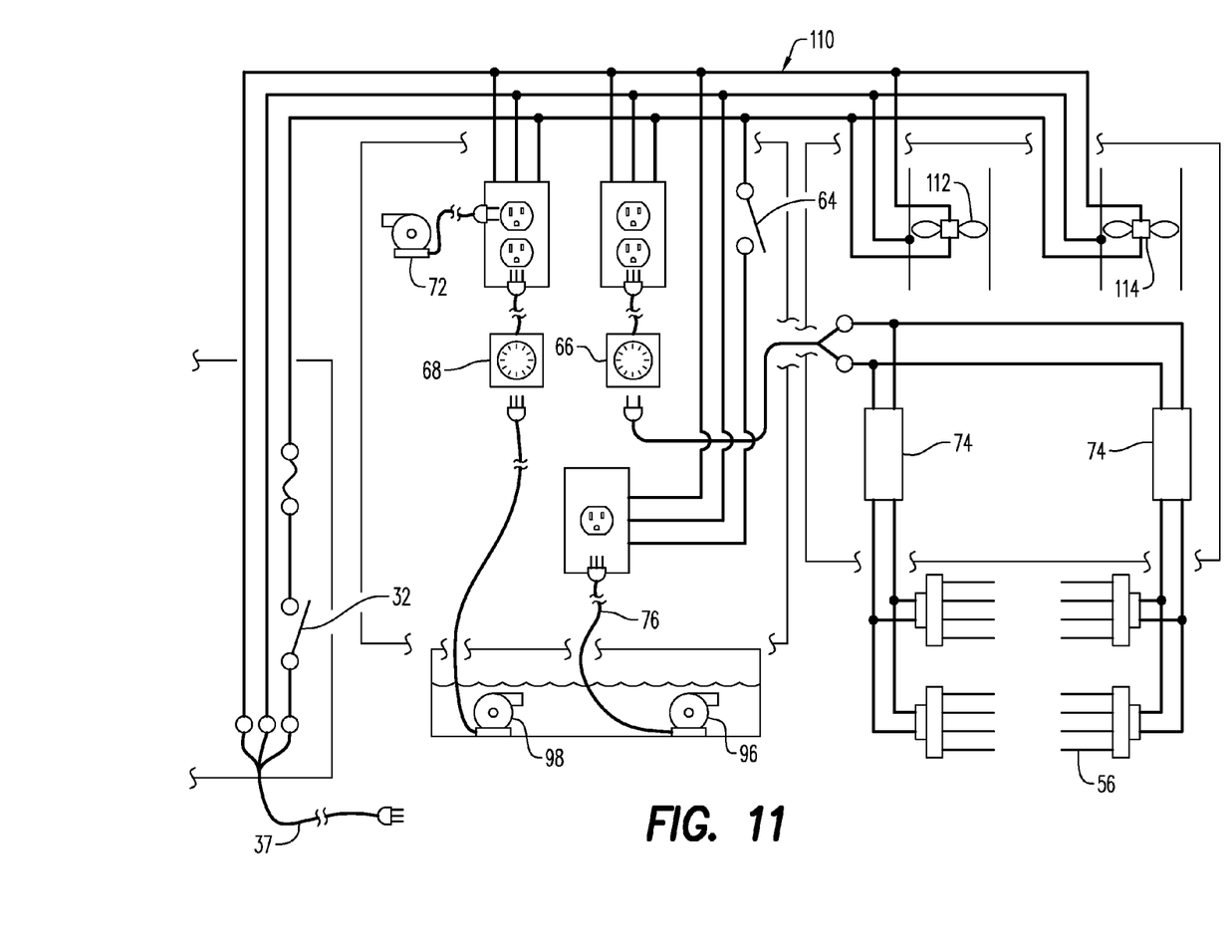
FIG. 11 is an electronic circuit depicting control features of the invention.

As best seen in FIGS. 3, 4 and 5, the system 10 defines a growing chamber 30 and a fragrance masking manifold 38. These separate enclosed areas 30 and 38 are formed by an upright electrical control panel 58 which extends vertically along an interior extent of the housing 12 from the top panel 44 of reservoir 40 to the top panel 14. As best seen in FIG. 5, the electrical control panel 58 supports all of the controlling electrical components including a fan control switch 64, a light timer 66, an irrigation pump timer 68, an air pump 72, and light ballasts 74. A reservoir discharge pump power cord 76 is also plugged into a conventional electrical power outlet. The function of these various components with respect to the corresponding counterparts will be described more fully herebelow. The electrical circuit diagram for this system is shown at numeral 110 in FIG. 11.

As best seen in FIGS. 4 to 8, the reservoir top panel 44 includes a removable reservoir access plate 48 having four spaced apart plant basket collars 46 attached thereatop, each basket collar 46 in alignment with a mating hole formed through the access plate 48. Each of these plant basket collars 46 is adapted to receive a plant basket P filled with a growing media GM of approximately 40½" "GORDON" rockwool cubes. Plant seeds are then placed into this growing media GM and nutrient enriched water is then periodically dispensed into the growing media and plant seeds which will be described more fully herebelow.

Figure 9:
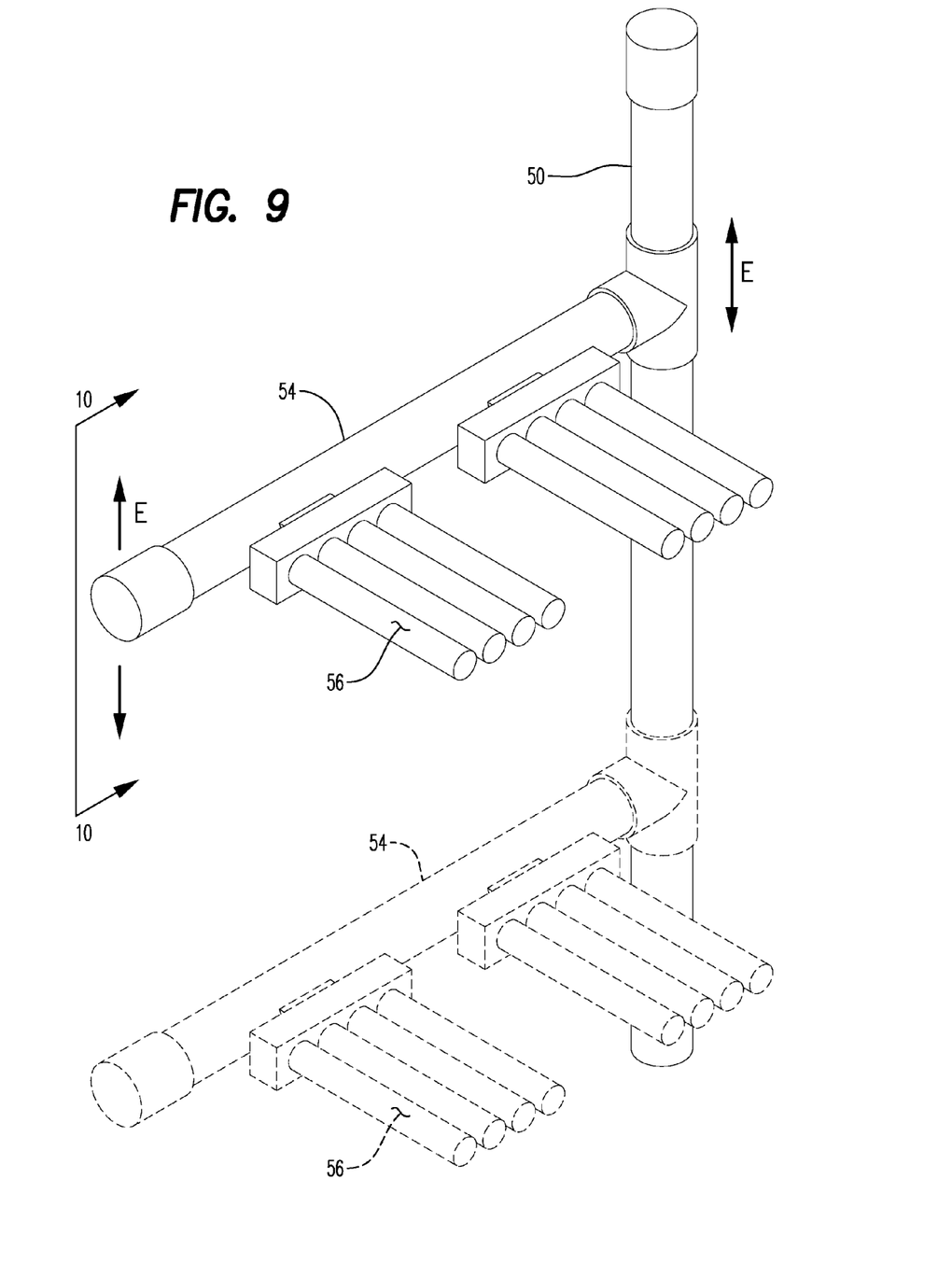
FIG. 9 is a perspective view of the air discharge tube and the growing lights and light support arm within the growing chamber.
Figure 10:
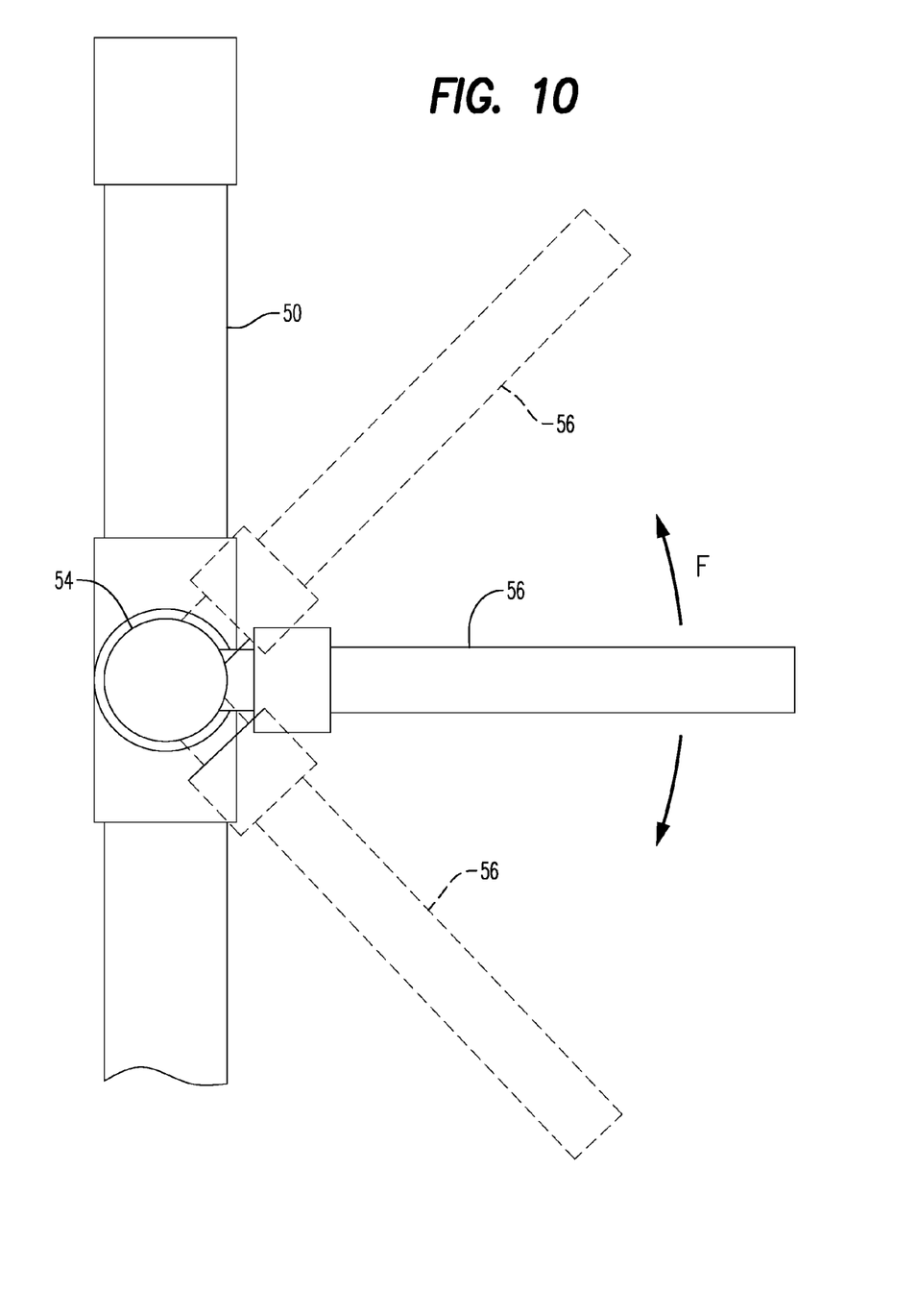
FIG. 10 is a top plan view of FIG. 9 absent the growing lights.

A lighting system is also provided to support plant growth within the system 10 in the form of a plurality of energy efficient 125 watt compact fluorescent bulbs which are supported on horizontally extending light support arms 54, which, in turn, are supported on upright perforated air discharge tubes 50. Each of these fluorescent lights 56 are in electrical communication with light ballasts 74, which, in turn, are in electrical communication with the input power into the system 10. As seen in FIGS. 9 and 10, the fluorescent lights 56 on light support arm 54 are movable vertically in the direction of arrow E along the air discharge tube 50 and are pivotally positionable in the direction of arrow F to best position each of the fluorescent lights 56 above the corresponding plant basket P at a proper height above the growth vegetation as it sprouts from the plant baskets P.

Delivery of fresh ambient air into the interior of the housing 12 is vital to nurture and support plant growth therewithin. As best seen in FIGS. 6 to 8 and 13, details of the fresh air circulation system of the invention are there shown. Fresh ambient air is introduced into the system in the direction of arrow D through fresh air inlet ports 36 formed into the back of reservoir 40 and the fiberglass reservoir liner 106. The fresh ambient air is directed through horizontally extending air transfer tubes 88 passing through the extent of reservoir chamber 102. By this arrangement, ambient air is modified in temperature to generally that of the interior of the reservoir chamber 102 and/or the water in the reservoir 40. The air is then directed upwardly into the upright air discharge tubes 50 which are capped at their upper distal end so that air is forced outwardly from each of the air discharge tubes 50 through spaced discharge ports 52 which preferably are oriented forwardly against the inner surface of the front panel 12*a*.

Figure 6:
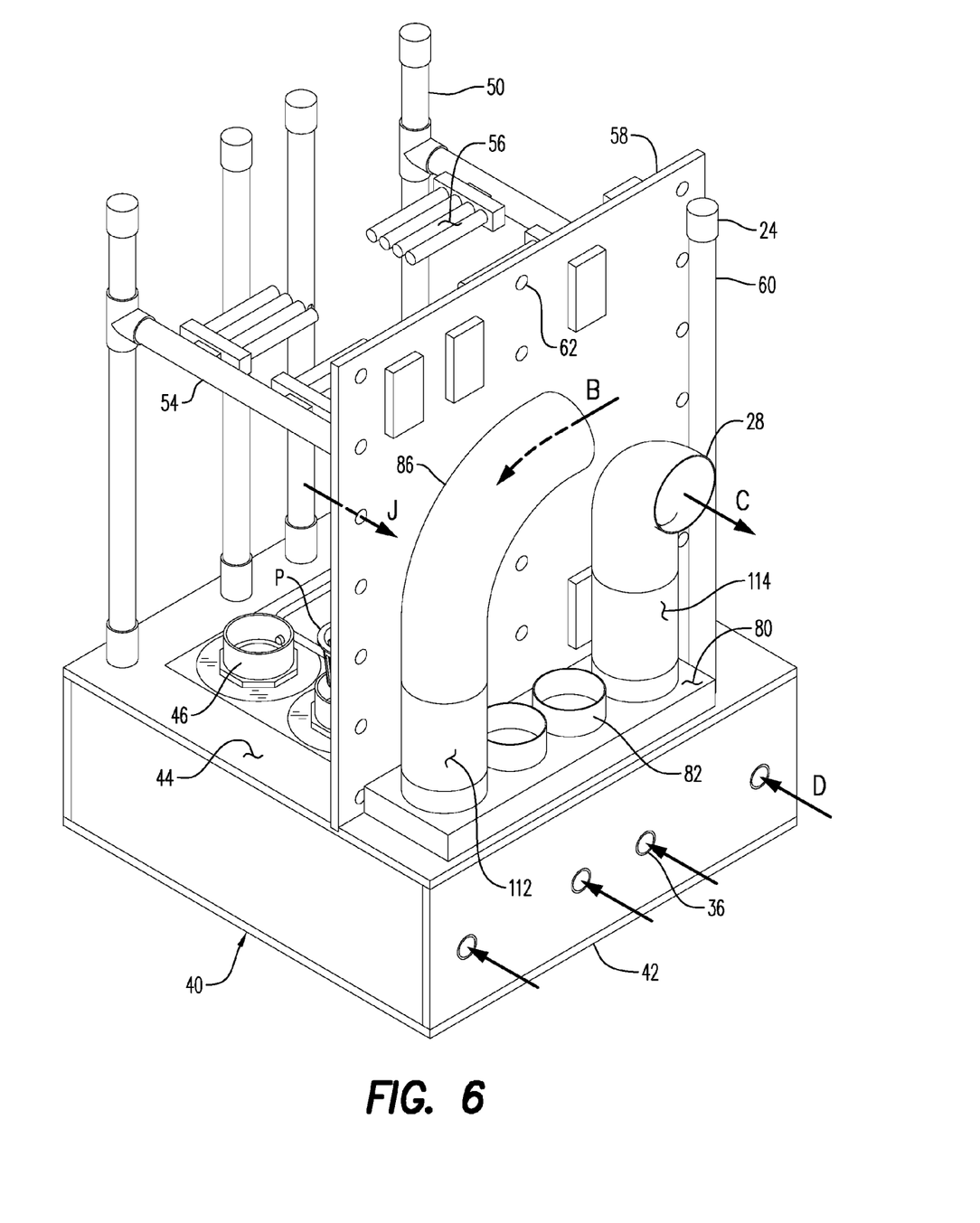
FIG. 6 is another perspective view of FIG. 5.
Figure 13:
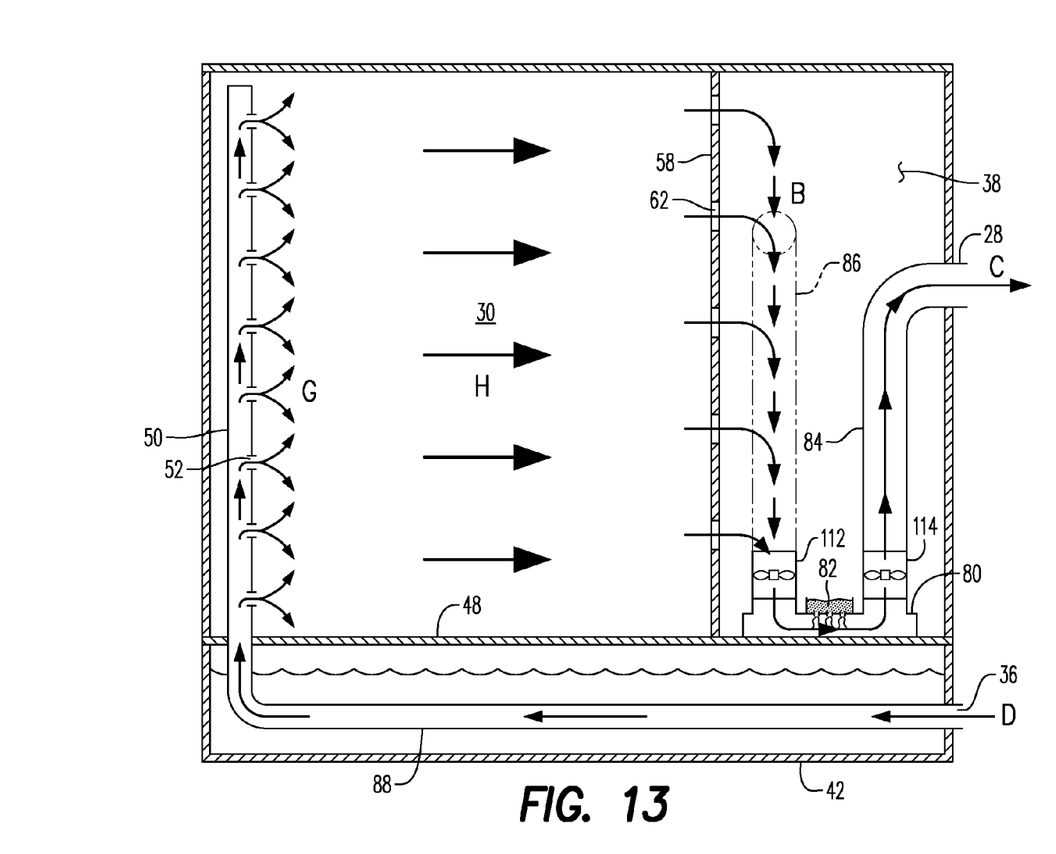
FIG. 13 is a simplified schematic view of the air flow system of the invention.

The air discharging from discharge ports 52 in the direction of arrow G shown schematically in FIG. 13 is then passed through the extent of the growing chamber 30, exiting therefrom through air transfer ports 62 formed through the electrical control panel 58 in the direction of arrow J. This system air flow of fresh air is produced by two inline fans 112 and 114 positioned at the bottom of the fragrance masking manifold 38 as best shown in FIGS. 6 and 13. Air flow entering into the fragrance masking manifold 38 is drawn into a fragrance masking manifold exhaust tube 86 and into the first inline fan 112 and passing beneath ventilation apertures formed in the bottom of fragrance masking units 82. Air flow is further drawn by the second inline fan 114 for discharge from exhaust port 28 in the direction of arrow C.

Still referring to FIGS. 6 and 13, air flow drawn from the growing chamber 30 will typically absorb odors produced by the growing process of vegetation within each of the plant baskets P. Because the invention is intended for use within the confines of a relatively small living space such as an apartment or a condo, these plant growth odors may become objectionable when discharged back into the ambient air in the direction of arrow C through air exhaust port 28. Therefore, it is preferred to include a means for reducing these plant growth odors by the addition of fragrance masking units 82. As the air flow flows between the inline fans 112 and 114, a deodorizing fragrance is drawn downwardly through apertures formed in the bottom of each of the fragrance masking units 82, thus deodorizing or adding a pleasant fragrance to the air discharging into the ambient air in the direction of arrow C.

Figure 7:
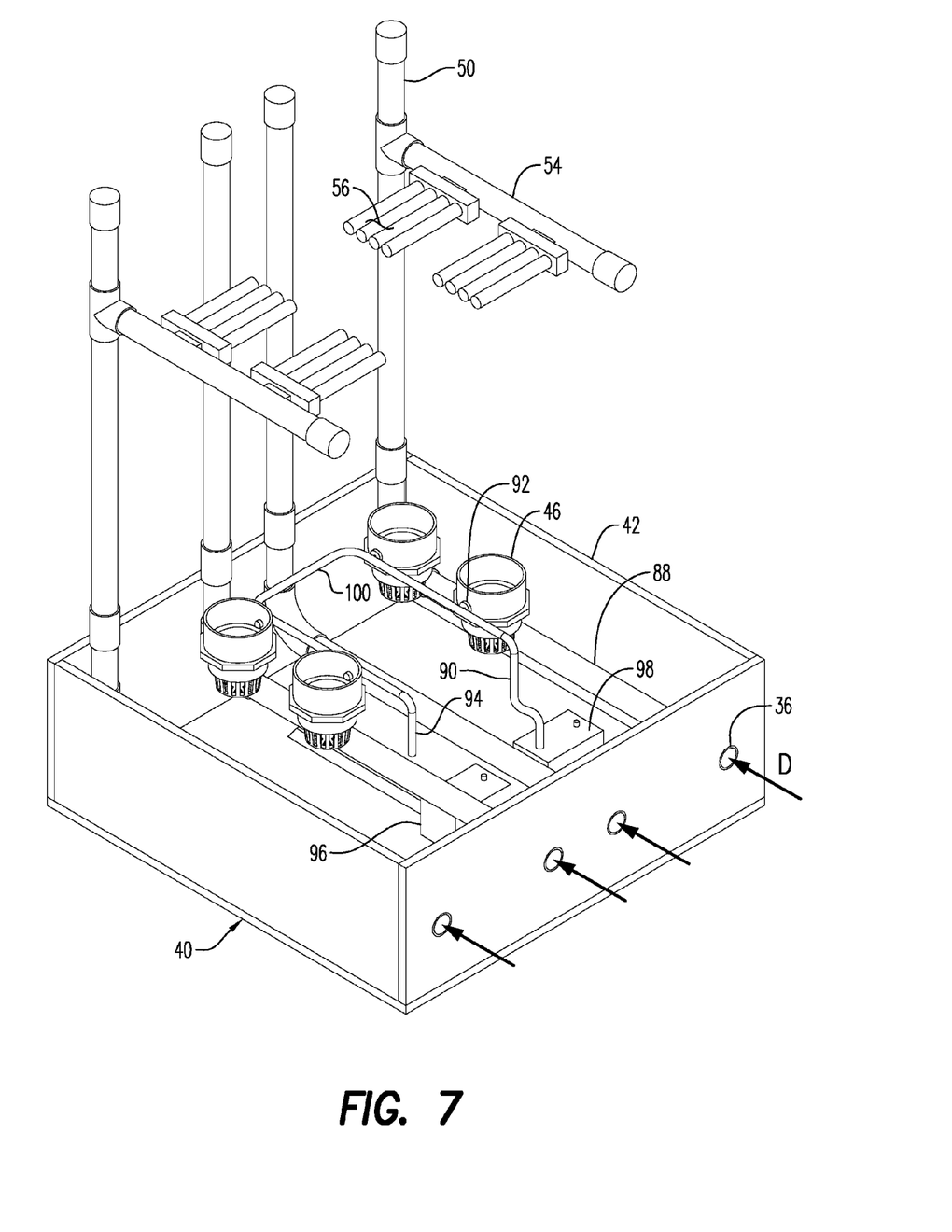
FIG. 7 is a perspective view of FIG. 6 absent the electrical control panel and fragrance masking manifold components for clarity.
Figure 8:
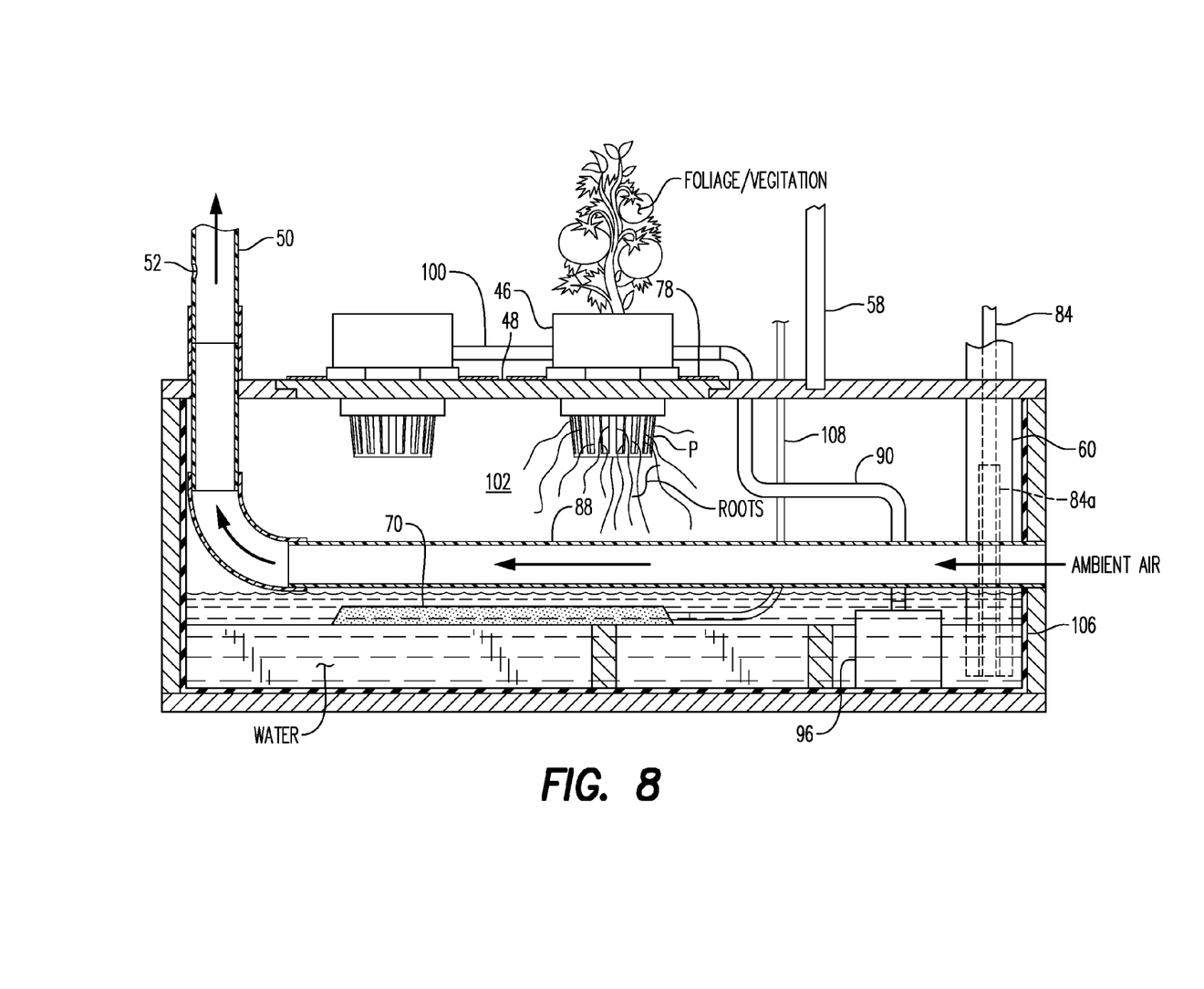
FIG. 8 is a longitudinal sectional view of the reservoir and plant basket collars of FIG. 6.
Figure 12:
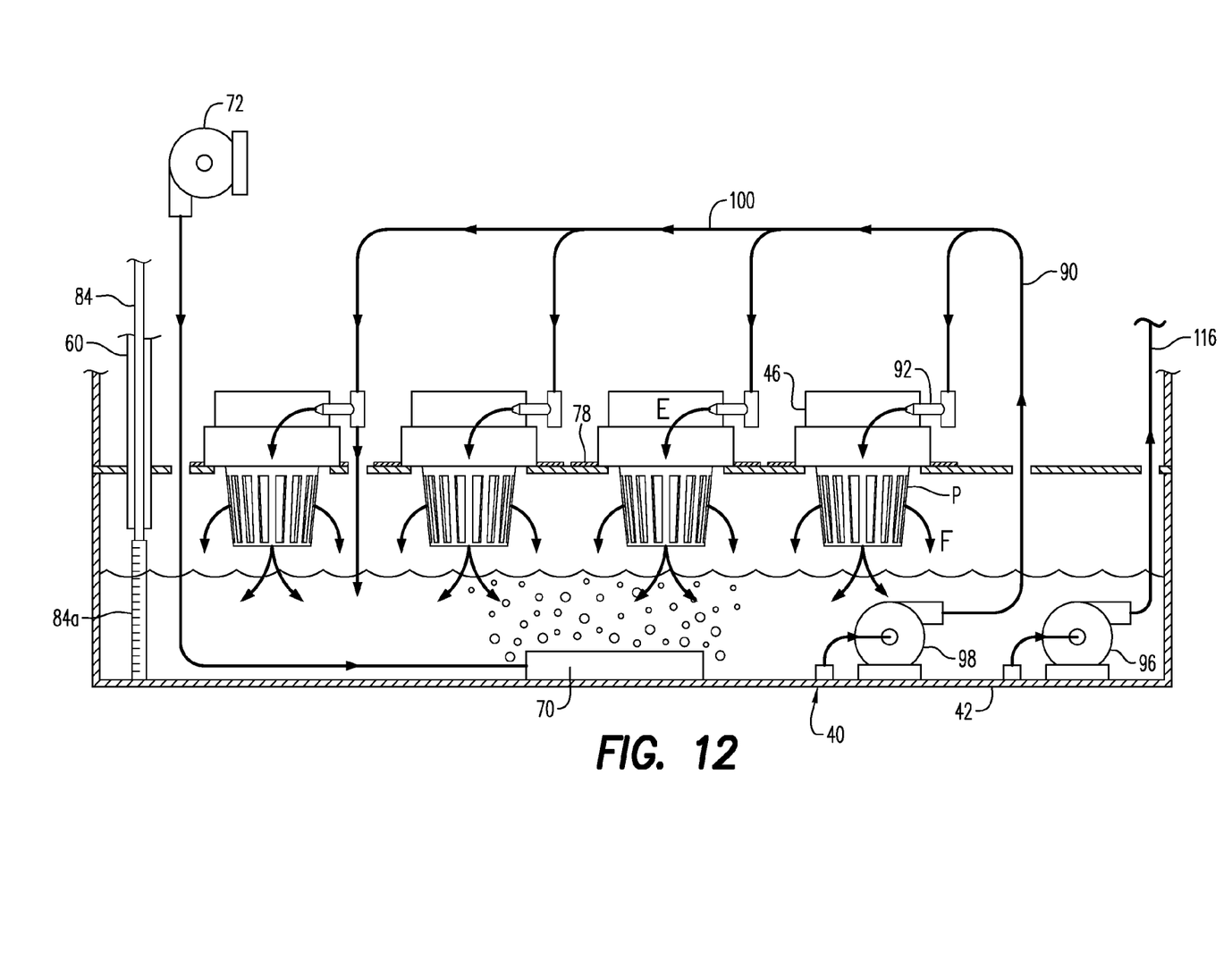
FIG. 12 is a simplified schematic view of the reservoir and hydroponic water delivery arrangement of the invention.

Referring now to FIGS. 7, 8 and 12, the irrigation system of the system 10 is best seen in these figures and includes an irrigation pump 98 positioned in the bottom of the reservoir 102 so as to draw water from the reservoir 102 when operational. A water feed conduit 90 receives reservoir water from the irrigation pump 98 and dispenses it into a water nozzle 92 affixed to each of the plant basket collars 46 so as to dispense a calibrated amount of water into each of the plant baskets P in the direction of arrows E atop the growing media and seeds or plant growth therein. Excess water then drains by gravity from the plant basket P in the direction of arrow F back into the reservoir.

To increase the oxygen content of the water in the reservoir 102, an air stone 70 submerged in the water is preferably provided. The air stone 70 receives air pumped from the air pump 72, dispersing the air into the water as best seen in FIG. 12. This oxygen enriching process is also supplemented by the addition of nutrients being added to the water as appropriate for the plant growth being nurtured and sustained within the growing chamber 30.

In order to be able to monitor the water level within the reservoir without opening and disturbing the delicate balanced environment created within the growing chamber 30, an elongated slender dipstick 82, best seen in FIG. 8, extends downwardly from a removable dipstick cover 24 which caps an elongated dipstick support tube 60. The lower end of the dipstick 84 is covered by a water absorbent sheath 84*a* or hollow cylinder which, when removed from the reservoir water will give a clear indication of the depth of that water.

Referring to FIGS. 7 and 12, should the reservoir water require replacement, a reservoir discharge pump 96 is also provided which is positioned in submerged fashion within the reservoir water and connected to an elongated reservoir discharge tube 116 such that the reservoir discharge pump 96 will pump and remove the reservoir water into a suitable container exterior to the system 10.

It is preferred, to enhance the effectiveness of the growth nurturing aspects of the growing chamber, that the interior surfaces of the growing chamber be covered with a light reflective foil. A reflective disc 78 be positioned around each of the faces of the growing collars 46 where mildew growth might become a problem as the reflected light will serve to prevent development of such undesirable growth.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A hydroponic plant growing system comprising:
    a housing having an exterior thereof defined by side, front, back and bottom panels and an openable lid, said housing also having an electrical control panel extending vertically along an interior extent of said housing dividing said housing into a growing chamber and a fragrance masking manifold, said electrical control panel having spaced holes formed therethrough for permitting air flow between said growing chamber and said fragrance masking manifold;
    a water reservoir defined by a reservoir top panel extending horizontally across the interior extent of said housing and being spaced above said bottom panel, said reservoir top panel having spaced plant basket collars each adapted to receive and support a plant cup, each plant cup having a bottom which extends into said reservoir to position plant roots in the plant cup within said reservoir above a water level of said reservoir and to position plant vegetation within said growing chamber;
    upright perforated spaced apart air discharge tubes extending upwardly from said reservoir top panel into said growing chamber for discharging ambient air into said growing chamber;
    a fan causing air to circulate through said growing chamber from said air discharge tubes into said fragrance masking manifold through said holes in said electrical control panel and discharging the air from said fragrance masking manifold;
    an irrigation pump for dispensing water from said reservoir into each plant cup, excess water delivered thereby draining downwardly through the roots back into said reservoir;
    an air fragrance masking unit positioned in communication with air flowing through said fragrance masking manifold from said growing chamber to mask odors from said growing chamber carried within air discharging from said fragrance masking manifold;
    a plant growth enhancing light source supported on at least one of said air discharge tubes.

2. The plant growing system of claim 1, further comprising:
    an air transfer tube connected between a proximal end of each of said air discharge tubes and a fresh air inlet port formed through said back panel;
    said transfer tubes positioned in said reservoir for modifying air temperature flowing through said growth chamber.

3. The plant growing system of claim 1, further comprising:
   an elongated removable dipstick extending at one end thereof into said reservoir for monitoring reservoir water level.

4. The plant growing system of claim 1, wherein:
   an inner surface of said front, side, and electrical control panels are light reflective for enhanced lighting of the plants.

5. The plant growing system of claim 1, further comprising:
   a light reflective disc positioned around each of said plant basket collars for enhanced lighting of the plant in said plant baskets.

6. The plant growing system of claim 1, further comprising:
   a timer for independently controlling the operation of said fan, irrigation pump, and light source.

7. The plant growing system of claim 1, further comprising:
   a reservoir discharge pump for removal of water from said reservoir.

8. The plant growing system of claim 1, further comprising:
   a water aerator within said reservoir for oxygen enriching water dispensed into each of the plant baskets.

9. A hydroponic plant growing system comprising:
   a housing having an exterior thereof defined by side, front, back and bottom panels and an openable lid, said housing also having an electrical control panel extending vertically along an interior extent of said housing dividing said housing into a growing chamber and a fragrance masking manifold, said electrical control panel having spaced holes formed therethrough for permitting air flow between said growing chamber and said fragrance masking manifold;
   a water reservoir defined by a reservoir top panel extending horizontally across the interior extent of said housing and being spaced above said bottom panel, said reservoir top panel having spaced plant basket collars each adapted to receive and support a plant cup, each plant cup having a bottom which extends into said reservoir to position plant roots in the plant cup within said reservoir above a water level of said reservoir and to position plant vegetation within said growing chamber;
   upright perforated spaced apart air discharge tubes extending upwardly from said reservoir top panel into said growing chamber for discharging ambient air into said growing chamber;
   a fan causing air to circulate through said growing chamber from said air discharge tubes into said fragrance masking manifold through said holes in said electrical control panel and discharging the air from said fragrance masking manifold;
   an irrigation pump for dispensing water from said reservoir into each plant cup, excess water delivered thereby draining downwardly through the roots back into said reservoir;
   an air fragrance masking unit positioned in communication with air flowing through said fragrance masking manifold from said growing chamber to mask odors from said growing chamber carried within air discharging from said fragrance masking manifold;
   a plant growth enhancing light source supported on at least one of said air discharge tubes;
   an air transfer tube connected between a proximal end of each of said air discharge tubes and a fresh air inlet port formed through said back panel, said transfer tubes being positioned in said reservoir for modifying air temperature flowing through said growth chamber;
   an elongated removable dipstick extending at one end thereof into said reservoir for monitoring reservoir water level;
   an inner surface of said front, side, and electrical control panels being light reflective for enhanced lighting of the plants;
   a light reflective disc positioned around each of said plant basket collars for enhanced lighting of the plant in said plant baskets;
   a timer for independently controlling the operation of said fan, irrigation pump, and light source; and
   a reservoir discharge pump for removal of water from said reservoir.

10. A method of hydroponic plant growing comprising:
    providing a plant growing system including:
       a housing having an exterior thereof defined by side, front, back and bottom panels and an openable lid, said housing also having an electrical control panel extending vertically along an interior extent of said housing dividing said housing into a growing chamber and a fragrance masking manifold, said electrical control panel having spaced holes formed therethrough for permitting air flow between said growing chamber and said fragrance masking manifold;
       a water reservoir defined by a reservoir top panel extending horizontally across the interior extent of said housing and being spaced above said bottom panel, said reservoir top panel having spaced plant basket collars each adapted to receive and support a plant cup, each plant cup having a bottom which extends into said reservoir to position plant roots in the plant cup within said reservoir above a water level of said reservoir and to position plant vegetation within said growing chamber;
       upright perforated spaced apart air discharge tubes extending upwardly from said reservoir top panel into said growing chamber for discharging ambient air into said growing chamber;
       a fan causing air to circulate through said growing chamber from said air discharge tubes into said fragrance masking manifold through said holes in said electrical control panel and discharging the air from said fragrance masking manifold;
       an irrigation pump for dispensing water from said reservoir into each plant cup, excess water delivered thereby draining downwardly through the roots back into said reservoir;
       an air fragrance masking unit positioned in communication with air flowing through said fragrance masking manifold from said growing chamber to mask odors from said growing chamber carried within air discharging from said fragrance masking manifold;
       a plant growth enhancing light source supported on at least one of said air discharge tubes;
    placing plant seeds into a growing medium in each of the plant baskets;
    activating said irrigation pump for selected time periods to pump water from said reservoir into each of the plant baskets;
    activating said fan to draw ambient air through said growing chamber and simultaneously masking any odors in the air being discharged from said air discharge ports after fragrance is added by said fragrance masking unit;

activating said light source for selected time periods to accelerate plant growth of the seeds within each of said plant baskets.

* * * * *